(12) United States Patent
Lainema

(10) Patent No.: US 11,323,710 B2
(45) Date of Patent: May 3, 2022

(54) QUANTIZATION PARAMETER DERIVATION FOR CROSS-CHANNEL RESIDUAL ENCODING AND DECODING

(71) Applicant: Nokia Technologies Oy, Espoo (FI)

(72) Inventor: Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/788,825

(22) Filed: Feb. 12, 2020

(65) Prior Publication Data

US 2020/0267388 A1 Aug. 20, 2020

(30) Foreign Application Priority Data

Feb. 19, 2019 (FI) ..................................... 20195127

(51) Int. Cl.
*H04N 19/124* (2014.01)
*H04N 19/186* (2014.01)
*H04N 19/196* (2014.01)
*H04N 19/157* (2014.01)

(52) U.S. Cl.
CPC ......... *H04N 19/124* (2014.11); *H04N 19/157* (2014.11); *H04N 19/186* (2014.11); *H04N 19/196* (2014.11)

(58) Field of Classification Search
None
See application file for complete search history.

(56) References Cited

U.S. PATENT DOCUMENTS 9,414,054 B2 * 8/2016 Sullivan ............... H04N 19/186
9,591,302 B2 * 3/2017 Sullivan ............... H04N 19/15
10,075,709 B2 9/2018 Xu et al.
(Continued)

FOREIGN PATENT DOCUMENTS

CN 103918265 A 7/2014
CN 107079150 A 8/2017
(Continued)

OTHER PUBLICATIONS

Lainema, "CE7-Related: Joint Coding Of Chrominance Residuals", Joint Video Expert Team (JVET) of ITU-T SG16 WP3 and ISO/IEC JTC1/SC29/WG11, JVET-M0305, 13th Meeting, Jan. 9-18, 2019, pp. 1-5.

(Continued)

*Primary Examiner* — Tyler W. Sullivan
(74) *Attorney, Agent, or Firm* — Joseph C. Drish; Harrington & Smith

(57) ABSTRACT

There are disclosed various methods, apparatuses and computer program products for video decoding or encoding. In some embodiments for decoding a block that contains quantized residual coefficients based on at least two color channels of a video presentation or an image is received. A first quantization parameter and an offset defining a relationship between the first quantization parameter and a second quantization parameter for the block are obtained. The value of the second quantization parameter is determined by using the first quantization parameter and the offset. The residual samples are reconstructed by dequantizing the quantized residual coefficients using the second quantization parameter, if the block has been encoded by using a cross-channel residual coding mode.

20 Claims, 8 Drawing Sheets

(56) References Cited

U.S. PATENT DOCUMENTS

| | | | | |
|---|---|---|---|---|
| 2015/0373327 | A1* | 12/2015 | Zhang | H04N 19/176 |
| | | | | 375/240.03 |
| 2015/0373349 | A1* | 12/2015 | Zhang | H04N 19/463 |
| | | | | 375/240.02 |
| 2016/0100168 | A1* | 4/2016 | Rapaka | H04N 19/12 |
| | | | | 375/240.03 |
| 2016/0261864 | A1* | 9/2016 | Samuelsson | H04N 19/176 |
| 2016/0373755 | A1* | 12/2016 | Xu | H04N 19/13 |
| 2018/0041779 | A1* | 2/2018 | Zhang | H04N 19/17 |
| 2018/0084284 | A1* | 3/2018 | Rosewarne | H04N 19/91 |
| 2018/0091829 | A1* | 3/2018 | Liu | H04N 19/70 |
| 2018/0213216 | A1* | 7/2018 | Hwang | H04N 13/156 |
| 2019/0124366 | A1* | 4/2019 | Zhao | H04N 19/463 |
| 2020/0195953 | A1* | 6/2020 | Lainema | H04N 19/176 |
| 2020/0260070 | A1* | 8/2020 | Yoo | H04N 19/103 |
| 2021/0218968 | A1* | 7/2021 | Chernyak | H04N 19/176 |
| 2021/0281845 | A1* | 9/2021 | Chernyak | H04N 19/172 |

FOREIGN PATENT DOCUMENTS

| | | |
|---|---|---|
| CN | 107181963 A | 9/2017 |
| KR | 20160040709 A | 4/2016 |
| WO | WO-2017/203930 A1 | 11/2017 |

OTHER PUBLICATIONS

Bross et al., "Versatile Video Coding (Draft 3)", Joint Video Experts Team (JVET) of ITU-T SG 16 WP 3 and ISO/IEC JTC 1/SC 29/WG 11, JVET-L1001 v3, 12th meeting, Oct. 3-12, 2018, 181 pages.

"Video Coding for Low Bit Rate Communication", Series H: Audiovisual and Multimedia Systems Infrastructure of audiovisual services—Coding of moving video, ITU-T Recommendation H.263, Jan. 2005, 226 pages.

"Advanced Video Coding for Generic Audiovisual Services", Series H: Audiovisual and Multimedia Systems nfrastructure of audiovisual services—Coding of moving video, Recommendation ITU-T H.264, Apr. 2017, 812 pages.

"High Efficiency Video Coding", Series H: Audiovisual and Multimedia Systems Infrastructure of audiovisua services—Coding of moving video, Recommendation ITU-T H.265, Feb. 2018, 692 pages.

"Parameter Values for Ultra-high Definition Television Systems for Production and International Programme Exchange", Recommendation ITU-R BT.2020, Oct. 2015, 8 pages.

"Parameter Values for the HDTV Standards for Production and International Programme Exchange", Recommendation ITU-R BT.709-6, Jun. 2015, 19 pages.

Office action received for corresponding Finnish Patent Application No. 20195127, dated Oct. 3, 2019, 9 pages.

Zhang et al., "Adaptive Color-Space Transform in HEVC Screen Content Coding", IEEE Journal on Emerging and Selected Topics in Circuits and Systems, vol. 6, No. 4, Dec. 2016, pp. 446-459.

Wein, "Video Coding Fundamentals" High Efficiency Video Coding: Coding Tools and Specification, 2015, pp. 23-71.

Kim et al., "Cross-Component Prediction in HEVC", IEEE Transactions on Circuits and Systems for Video Technology, Nov. 2, 2015, pp. 1-11.

Extended European Search Report received for corresponding European Patent Application No. 20155385.6, dated Jul. 6, 2020, 9 pages.

Chono, "Enhanced Croma QP Signalling for Adaptive Cross-Component Transform in SCC Extensions", Joint Collaborative Team on Video Coding (JCT-VC) ofITU-T SG 16 WP 3 and ISO/IEC JTC 1/SC 29/WG 11, JCTVC-S0040-V2, 19th Meeting, Oct. 17-24, 2014, pp. 1-6.

Lainema, "CE7: Joint Coding of Chrominance Residuals (CE7-1)", Joint Video Experts Team (JVET) ofITU-T SG 16 WP 3 and ISO/IEC JTC 1/SC 29/WG 11, JVET-N0054, 14th Meeting, Mar. 19-27, 2019, 5 pages.

\* cited by examiner

QUANTIZATION PARAMETER DERIVATION FOR CROSS-CHANNEL RESIDUAL ENCODING AND DECODING

TECHNICAL FIELD

The present application relates generally to encoding and decoding of video presentations or images.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Video and image samples may be encoded using color representations such as YUV or YCbCr consisting of one luminance Y and two chrominance channels (components) Cb, Cr. In some approaches the samples in each channel are predicted and the residual signal in each channel is coded separately. The encoding of such residual signals typically includes forward transform of the residual samples and quantization of the resulting transform coefficients. Decoding includes inverse quantization of the received transform coefficients and inverse transform of the dequantized coefficients to reconstruct decoded residual samples. The accuracy of the quantization process can be specified for each channel separately, however such definition may not be optimal for all scenarios and coding modes.

SUMMARY

Some embodiments provide a method for encoding and decoding video information. In some embodiments an apparatus, a computer program product, a computer-readable medium for implementing the method are provided.

In accordance with an embodiment a method determines quantization parameters for transform blocks using joint coding of residual samples from two or more channels. More specifically, a quantization parameter may be determined for a cross-channel residual block that is independent from the quantization parameters of the channels the cross-channel coding is applied to. In one embodiment cross-channel coding is applied to the two chrominance channels in the video or image, and the cross-channel quantizer parameter is derived from that of the full resolution luminance channel. In an alternative embodiment the quantization parameter for a residual block using cross-channel coding is calculated based on a quantization parameter of a virtual channel which is determined by combining quantization parameters of two or more channels.

Various aspects of examples of the invention are provided in the detailed description.

According to a first aspect, there is provided a method comprising:
receiving a block that contains quantized residual coefficients based on at least two color channels of a video presentation or an image;
obtaining a first quantization parameter;
obtaining an offset defining a relationship between the first quantization parameter and a second quantization parameter for the block;
determining the value of the second quantization parameter by using the first quantization parameter and the offset;
reconstructing the residual samples by dequantizing the quantized residual coefficients using the second quantization parameter, if the block has been encoded by using a cross-channel residual coding mode.

According to a second aspect, there is provided an apparatus comprising means for.
receiving a block that contains quantized residual coefficients based on at least two color channels of a video presentation or an image;
obtaining a first quantization parameter,
obtaining an offset defining a relationship between the first quantization parameter and a second quantization parameter for the block;
determining the value of the second quantization parameter by using the first quantization parameter and the offset;
reconstructing the residual samples by dequantizing the quantized residual coefficients using the second quantization parameter, if the block has been encoded by using a cross-channel residual coding mode.

According to a third aspect, there is provided an apparatus comprising at least one processor; and at least one memory including computer program code the at least one memory and the computer program code configured to, with the at least one processor, cause the apparatus to perform at least the following:
receive a block that contains quantized residual coefficients based on at least two color channels of a video presentation or an image;
obtain a first quantization parameter;
obtain an offset defining a relationship between the first quantization parameter and a second quantization parameter for the block;
determine the value of the second quantization parameter by using the first quantization parameter and the offset;
reconstruct the residual samples by dequantizing the quantized residual coefficients using the second quantization parameter, if the block has been encoded by using a cross-channel residual coding mode.

According to a fourth aspect, there is provided a computer program product including one or more sequences of one or more instructions which, when executed by one or more processors, cause an apparatus to at least perform the following:
receive a block that contains quantized residual coefficients based on at least two color channels of a video presentation or an image;
obtain a first quantization parameter;
obtain an offset defining a relationship between the first quantization parameter and a second quantization parameter for the block;
determine the value of the second quantization parameter by using the first quantization parameter and the offset;
reconstruct the residual samples by dequantizing the quantized residual coefficients using the second quantization parameter, if the block has been encoded by using a cross-channel residual coding mode.

According to a fifth aspect, there is provided a method comprising:
receiving syntax elements of a partitioning of a picture comprising inter coded coding units and intra coded coding units;
processing the coding units of the partitioning of a picture in a first scanning order comprising:
reconstructing inter coded coding units by motion compensated prediction;
processing coding units of the partitioning of a picture in a second scanning order comprising:
reconstructing intra coded coding units by predicting a current coding unit using one or more reference samples from at least one of:
coding units preceding the current coding unit in the second scanning order;
coding units succeeding the current coding unit in the second scanning order.

According to a sixth aspect, there is provided an apparatus comprising means for:
receive syntax elements of a partitioning of a picture comprising inter coded coding units and intra coded coding units;
process the coding units of the partitioning of a picture in a first scanning order comprising:
reconstructing inter coded coding units by motion compensated prediction;
process coding units of the partitioning of a picture in a second scanning order comprising:
reconstructing intra coded coding units by predicting a current coding unit using one or more reference samples from at least one of:
coding units preceding the current coding unit in the second scanning order;
coding units succeeding the current coding unit in the second scanning order.

According to a seventh aspect, there is provided an apparatus comprising at least one processor; and at least one memory including computer program code the at least one memory and the computer program code configured to, with the at least one processor, cause the apparatus to perform at least the following:
receive syntax elements of a partitioning of a picture comprising inter coded coding units and intra coded coding units;
process the coding units of the partitioning of a picture in a first scanning order comprising:
reconstructing inter coded coding units by motion compensated prediction;
process coding units of the partitioning of a picture in a second scanning order comprising:
reconstructing intra coded coding units by predicting a current coding unit using one or more reference samples from at least one of:
coding units preceding the current coding unit in the second scanning order;
coding units succeeding the current coding unit in the second scanning order.

According to an eighth aspect, there is provided a computer program product including one or more sequences of one or more instructions which, when executed by one or more processors, cause an apparatus to at least perform the following:
receive syntax elements of a partitioning of a picture comprising inter coded coding units and intra coded coding units;
process the coding units of the partitioning of a picture in a first scanning order comprising:
reconstructing inter coded coding units by motion compensated prediction;
process coding units of the partitioning of a picture in a second scanning order comprising:
reconstructing intra coded coding units by predicting a current coding unit using one or more reference samples from at least one of:
coding units preceding the current coding unit in the second scanning order;
coding units succeeding the current coding unit in the second scanning order.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 2:
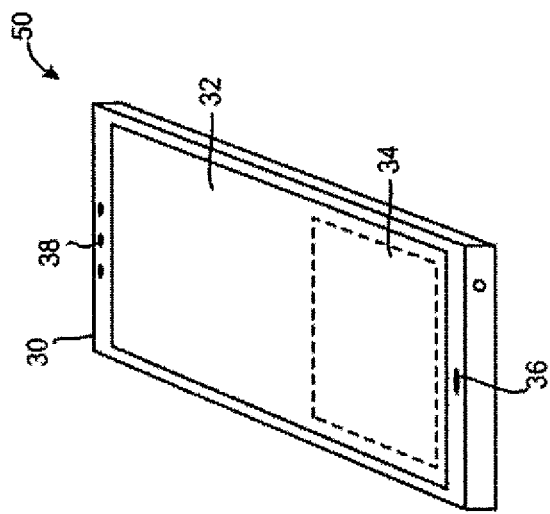
FIG. 2 illustrates a layout of an apparatus according to an embodiment.
Figure 1:
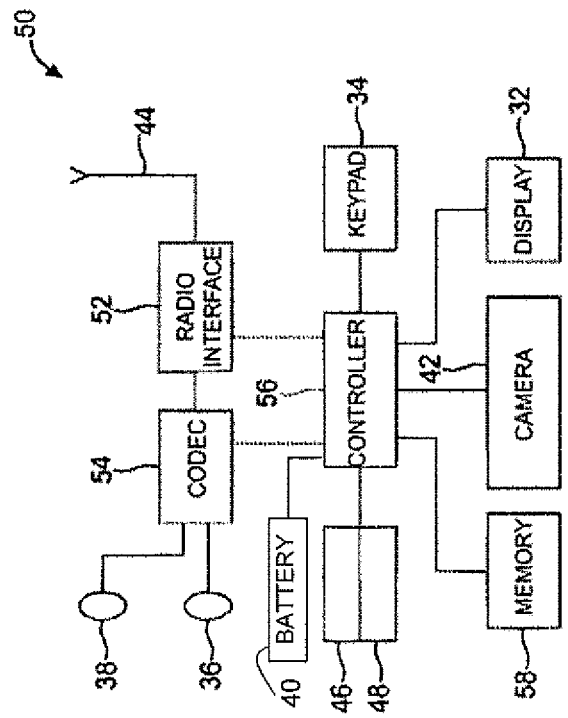
FIG. 1 illustrates a block diagram of a video coding system according to an embodiment.

FIG. 1 shows a video coding system as a schematic block diagram of an apparatus or electronic device 50 according to an embodiment. The electronic device 50 may incorporate a codec according to an embodiment. FIG. 2 shows a layout of an apparatus according to an embodiment. The elements of FIGS. 1 and 2 will be explained next.

The electronic device 50 may, for example, be a mobile terminal or user equipment of a wireless communication system. However, it is appreciated that embodiments of the invention may be implemented within any electronic device or apparatus which may perform encoding and decoding, or encoding or decoding video images.

The apparatus 50 may comprise a housing 30 for incorporating and protecting the device. The apparatus 50 may further comprise a display 32 in the form of a liquid crystal display. In other embodiments, the display may be any suitable display technology suitable to display an image or video. The apparatus 50 may further comprise a keypad 34. According to an embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which—according to an embodiment—may be any one of: an earpiece 38, speaker, or an analogue audio or digital audio output connection. The apparatus 50 may also comprise a battery 40 (or in an embodiment, the device may be powered by any suitable mobile energy device, such as solar cell, fuel cell or clockwork generator). The apparatus may further comprise a camera 42 capable of recording or capturing images and/or video. According to an embodiment, the apparatus 50 may further comprise an infrared port for short range line of sight communication to other devices. According to an embodiment, the apparatus 50 may further comprise any suitable short range communication solution such as for example a Bluetooth® wireless connection or a USB/firewire wired connection.

The apparatus 50 may comprise a controller 56 or processor for controlling the apparatus 50. The controller 56 may be connected to memory 58 which according to an embodiment may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller 56.

The apparatus 50 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may further comprise a radio interface circuitry 52 connected to the controller and suitable for generating wireless communication signals for example for communication with a cellular communications network, a wireless communication system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera capable of recording or detecting individual frames which are then passed to the codec 54 or controller for processing. According to an embodiment, the apparatus may receive the video image data for processing from another device prior to transmission and/or storage. According to an embodiment, the apparatus 50 may receive either wirelessly or by a wired connection the image for coding/decoding.

Figure 3:
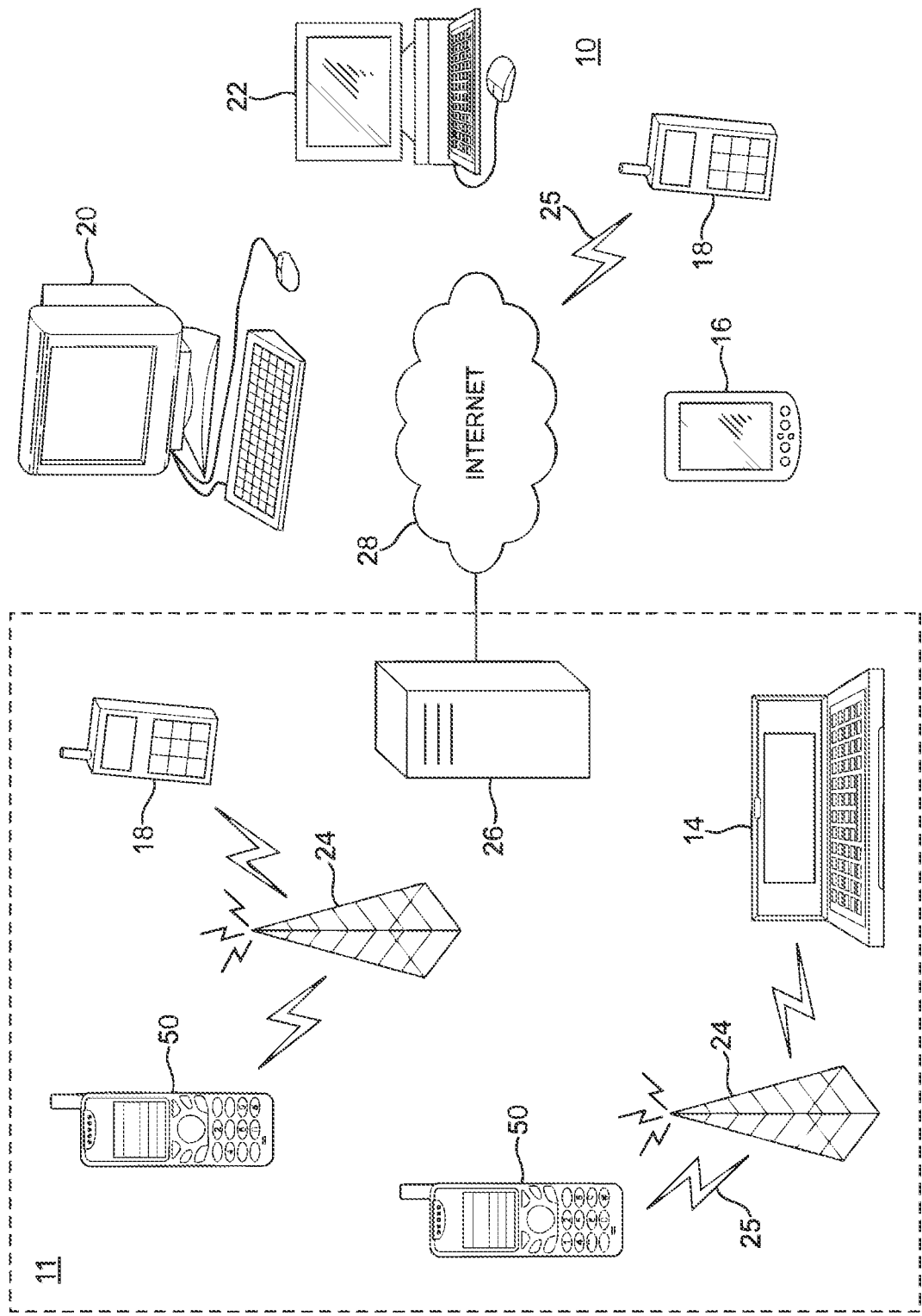
FIG. 3 illustrates an arrangement for video coding comprising a plurality of apparatuses, networks and network elements according to an embodiment.

FIG. 3 shows an arrangement for video coding comprising a plurality of apparatuses, networks and network elements according to an embodiment. With respect to FIG. 3, an example of a system within which embodiments of the invention can be utilized is shown. The system 10 comprises multiple communication devices which can communicate through one or more networks. The system 10 may comprise any combination of wired or wireless networks including but not limited to a wireless cellular telephone network (such as a GSM, UMTS, CDMA network etc.), a wireless local area network (WLAN) such as defined by any of the IEEE 802.x standards, a Bluetooth® personal area network, an Ethernet local area network, a token ring local area network, a wide area network and the Internet.

The system 10 may include both wired and wireless communication devices or apparatus 50 suitable for implementing embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, any combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA) transmission control protocol-internet protocol (TCP-IP), short messaging service (SMS), multimedia messaging service (MMS) email, instant messaging service (IMS), Bluetooth®, IEEE 802.11 and any similar wireless communication technology. A communications device involved in implementing various embodiments of the present invention may communicate using various media including, but not limited to, radio, infrared, laser, cable connections and any suitable connection.

Video encoder may comprise an encoder that transforms the input video into a compressed representation suited for storage/transmission, and a decoder is able to uncompress the compressed video representation back into a viewable form. A video encoder and/or a video decoder may also be separate from each other, i.e. need not form a codec. The encoder may discard some information in the original video sequence in order to represent the video in more compact form (i.e. at lower bitrate).

Hybrid video codecs, for example ITU-T H.263 and H.264, may encode the video information in two phases. At first, pixel values in a certain picture are (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size of transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

In block based image and video coding the sample prediction process may be limited to using the already encoded or decoded samples from left and above neighboring blocks as the below and right blocks are not yet processed at the time of processing the current block and thus not available as reference for the prediction process. This may lead to suboptimal in coding efficiency as in some case the right and below neighbors could provide better reference for sample prediction process than what is available in the top and left neighbors; or right and below neighbors could improve the accuracy of the prediction process if used together with the top and left neighbors.

The Advanced Video Coding (H.264/AVC a.k.a. AVC) standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of L265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (10/2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr, regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N (where N is a positive integer) such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

Figure 6:
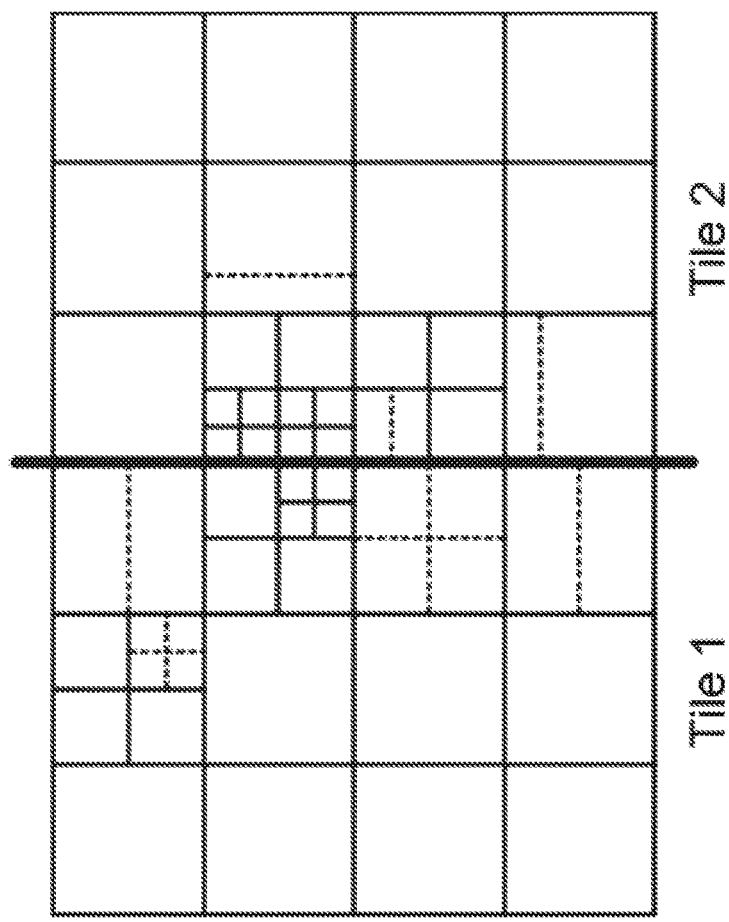
FIG. 6 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan order and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 6 shows an example of a picture consisting of two tiles partitioned into square coding units (solid lines) which have been further partitioned into rectangular prediction units (dashed lines).

The decoder may reconstruct the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder may sum up the prediction and prediction error signals (pixel values) to form the output video frame. The decoder (and encoder) may also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

Instead, or in addition to approaches utilizing sample value prediction and transform coding for indicating the coded sample values, a color palette based coding may be used. Palette based coding refers to a family of approaches for which a palette, i.e. a set of colors and associated indexes, is defined and the value for each sample within a coding unit is expressed by indicating its index in the palette. Palette based coding can achieve good coding efficiency in coding units with a relatively small number of colors (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead their values are indicated individually for each escape coded sample.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

The motion information may be indicated in video codecs with motion vectors associated with each motion compensated image block. Each of these motion vectors may represent the displacement of the image block in the picture to be coded (in the encoder side) or decoded (in the decoder side) and the prediction source block in one of the previously coded or decoded pictures. In order to represent motion vectors efficiently, those vectors may be coded differentially with respect to block specific predicted motion vectors. In video codecs, the predicted motion vectors may be created in a predefined way, e.g. by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector prediction. In addition to predicting the motion vector values, the reference index of a previously coded/decoded picture may be predicted. The reference index may be predicted e.g. from adjacent blocks and/or co-located blocks in a temporal reference picture. Moreover, high efficiency video codecs may employ an additional motion information coding/decoding mechanism, called "merging/merge mode", where all the motion field information, which may include motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signaled among a list of motion field candidate list filled with motion field information of available adjacent/co-located blocks.

Some video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset may be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods may improve the coding efficiency substantially in presence of repeating structures within the frame—such as text or other graphics.

In video codecs, the prediction residual after motion compensation may be first transformed with a transform kernel (e.g. DCT) and then coded. The reason for this is that there may still exist some correlation among the residual and transform may in many cases help reduce this correlation and provide more efficient coding.

Video encoders may utilize Lagrangian cost functions to find optimal coding modes, e.g. the desired macroblock mode and associated motion vectors. This kind of cost function uses a weighting factor λ (lambda) to tie together the (exact or estimated) image distortion due to lossy coding methods and the (exact or estimated) amount of information that is required to represent the pixel values in an image area:

$$C=D+\lambda R \qquad (1)$$

Where C is the Lagrangian cost to be minimized, D is the image distortion (e.g. Mean Squared Error) with the mode and motion vectors considered, and R is the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. The nuh_layer_id syntax element of HEVC may carry information on the scalability hierarchy.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-DR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved//reserved non-RAP non-reference VCL NAL unit types |
| 11, 13, 15 | RSV_VCL_R11 RSV_VCL_R13 RSV_VCL_R15 | Reserved//reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |

-continued

| nal_unit_type | Name of nal_unit_type | Content of NAL unit and RBSP syntax structure |
|---|---|---|
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved//reserved RAP VCL NAL unit types |
| 24 . . . 31 | RSV_VCL24 . . . RSV_VCL31 | Reserved//reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. An IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in the bitstream containing a base layer is an IRAP picture. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. There may be pictures in a bitstream that contain only intra-coded slices that are not RAP pictures. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId).

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order may be decodable if random access is performed at the CRA picture, and hence clean random access may be achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture may contain syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be, for example, one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise three parts, the base VPS, the VPS extension, and the VPS VUI, where the VPS extension and the VPS VUI may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations. The VPS VUI comprises syntax elements that may be useful for decoding or other purposes but are not required to be used in the HEVC decoding process.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SE messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRA picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal HandleCraAsBlaFlag. NoRaslOutputFlag equal to 1 has an impact that the RASL pictures associated with the TRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an IRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

Scalable video coding may refer to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may consist of a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer may be predicted from lower layers. Similarly the pixel data of the lower layers may be used to create prediction for the enhancement layer.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as a prediction reference for an enhancement layer, it is referred to as an inter-layer reference picture.

In addition to quality scalability, there may also be other scalability modes or scalability dimensions, which may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension. More generally, in hybrid codec scalability one or more layers may be coded according to one coding standard or specification and other one or more layers may be coded according to another coding standard or specification. For example, there may be two layers coded according to the MVC extension of H.264/AVC (out of which one is a base layer coded according to H.264/AVC), and one or more additional layers coded according to MV-HEVC. Furthermore, the number of coding standard or specifications according to which different layers of the same bitstream are coded might not be limited to two in hybrid codec scalability.

It should be understood that many of the scalability types may be combined and applied together. For example color gamut scalability and bit-depth scalability may be combined.

In the above scalability cases, base layer information may be used to code enhancement layer to minimize the additional bitrate overhead.

Scalability may be enabled in two ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

In order to be able to utilize parallel processing, images may be split into independently codable and decodable image segments (slices or tiles). Slices may refer to image segments constructed of certain number of basic coding units that are processed in default coding or decoding order, while tiles may refer to image segments that have been defined as rectangular image regions that are processed at least to some extend as individual frames.

Figure 4:
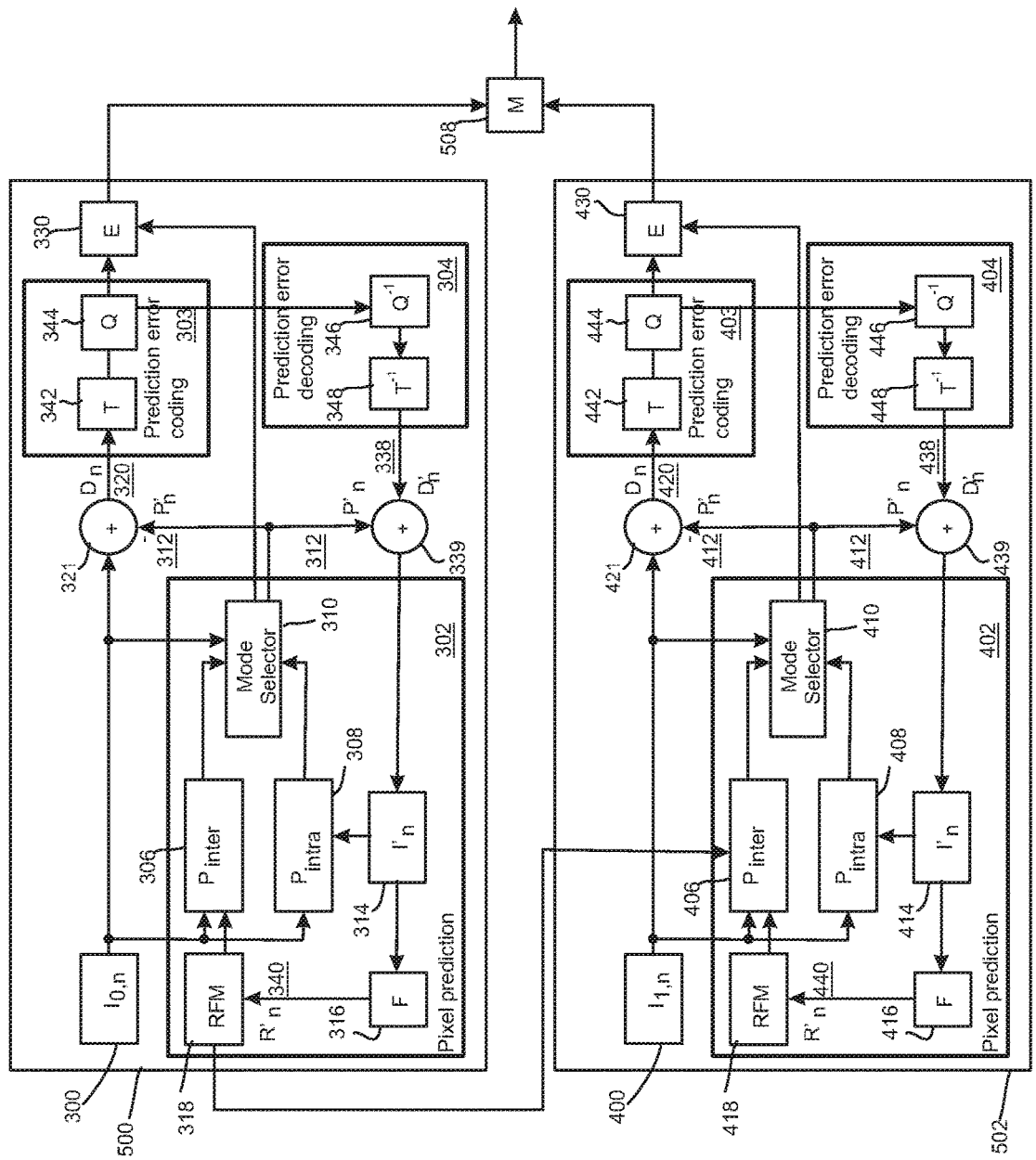
FIG. 4 illustrates a block diagram of a video encoder according to an embodiment.

FIG. 4 shows a block diagram of a video encoder in accordance with an embodiment. FIG. 4 presents an encoder for two layers, but it would be appreciated that presented encoder could be similarly extended to encode more than two layers, or only one layer. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current coding unit, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, e.g. DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Figure 5:
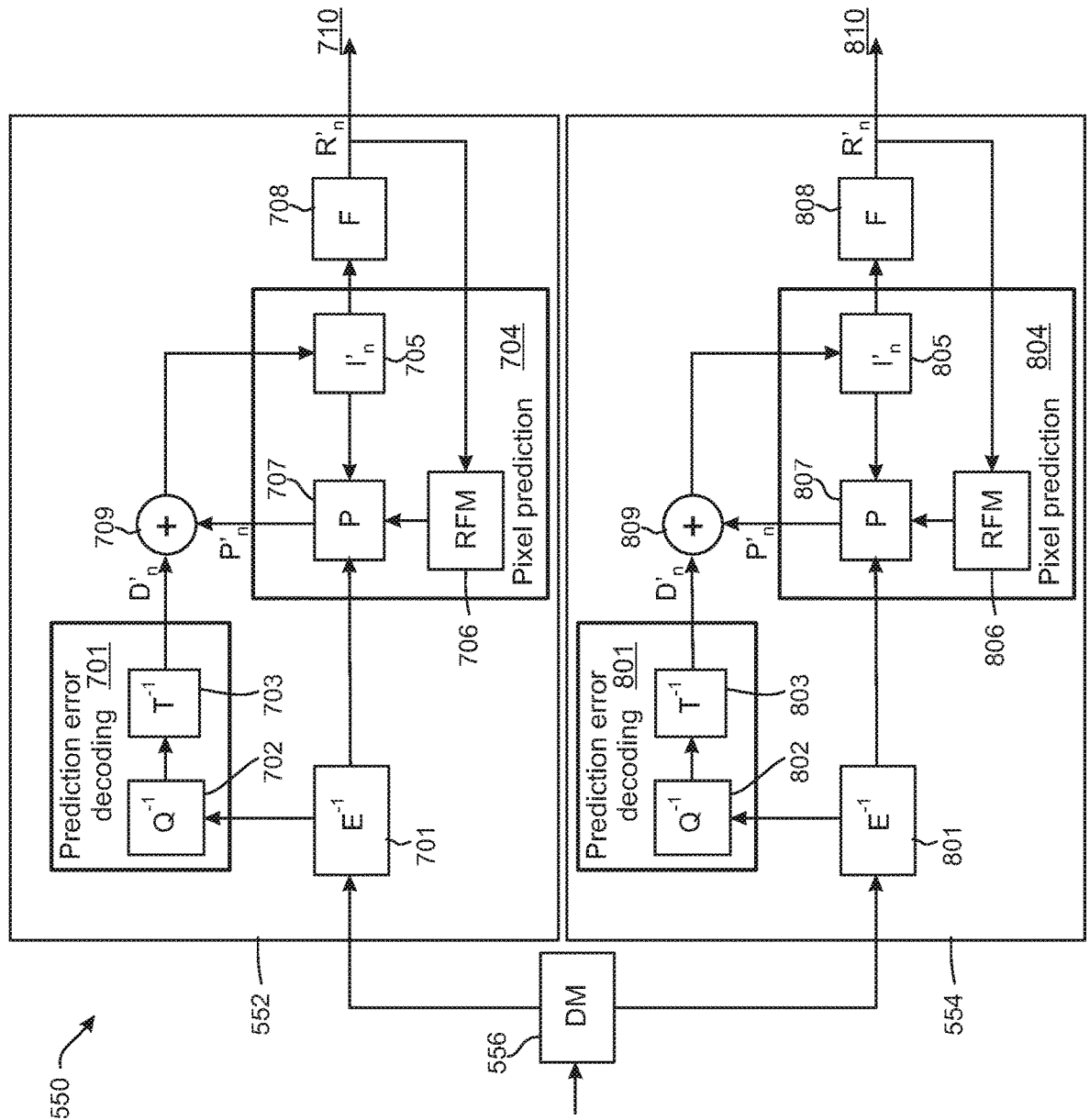
FIG. 5 illustrates a block diagram of a video decoder according to an embodiment.

In a decoder, similar operations may be performed to reconstruct samples of a block. FIG. 5 shows a block diagram of a video decoder in accordance with an embodiment. FIG. 5 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate pixel prediction operations. Blocks 705, 805 illustrate preliminary reconstructed images (I'n). Reference R'n stands for a final reconstructed image. Blocks 703, 803 illustrate inverse transform (T). Blocks 702, 802 illustrate inverse quantization (Q'). Blocks 701, 801 illustrate entropy decoding (E). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base view/non-base view components to obtain the preliminary reconstructed images 705, 805 (I'n). Preliminary reconstructed and filtered base view images may be output 710 from the first decoder section 552 and preliminary reconstructed and filtered base view images may be output 810 from the first decoder section 554.

In the following, an embodiment for encoding a picture by a video encoder will be described in more detail with reference to the block diagram of FIG. 7a and the flow diagram of FIG. 8a.

In the following it is assumed that the video information comprises three color channels, which are a luminance channel Y and two chrominance channels Cr, Cb, but similar principles are also applicable to other color formats such as RGB (Red, Green, Blue) color format.

Figure 7A:
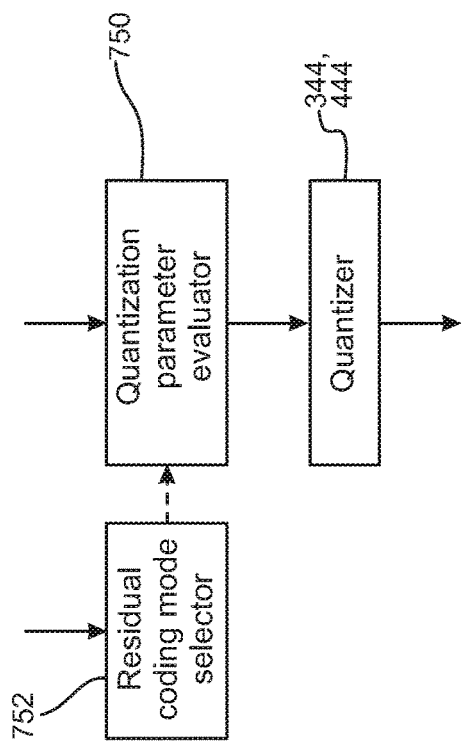
FIG. 7a illustrates an example of a quantization parameter evaluator of an encoder, in accordance with an embodiment.
Figure 8A:
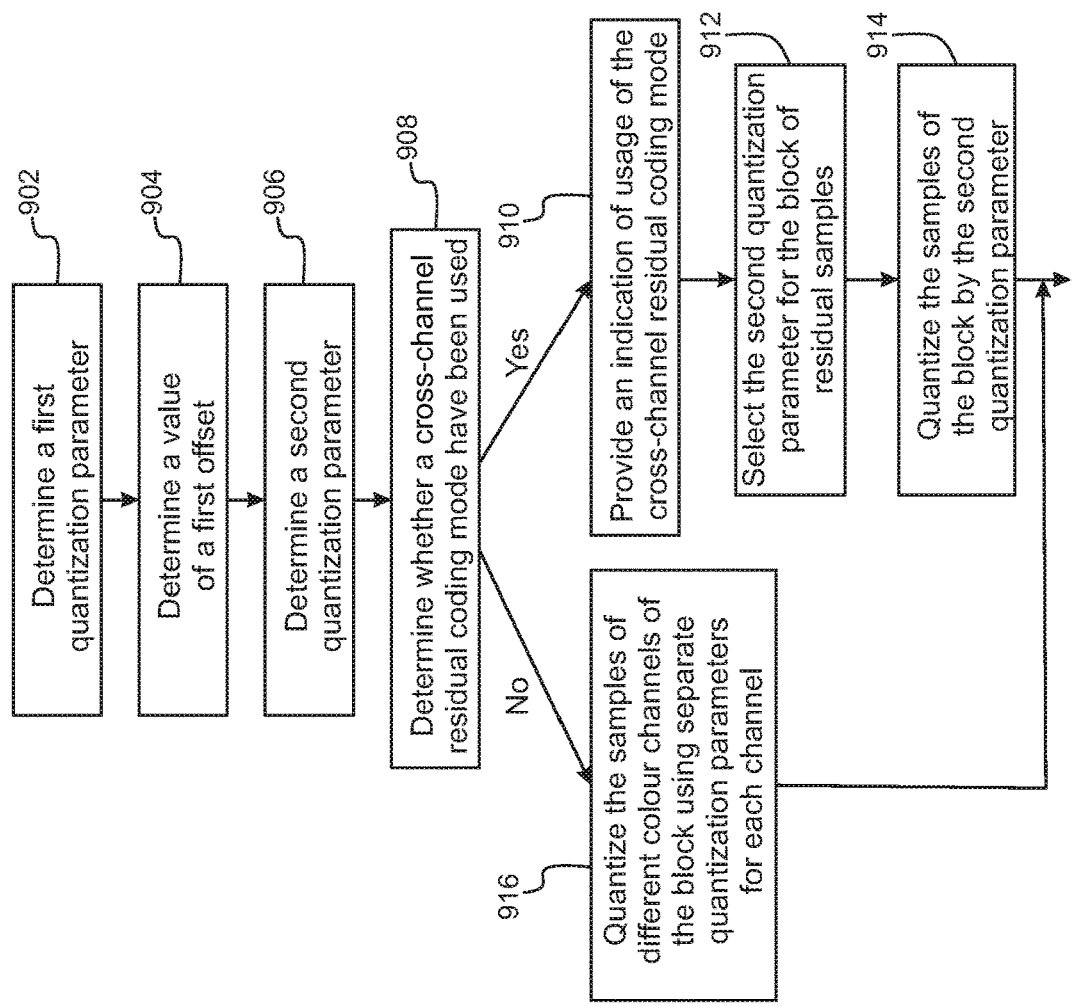
FIG. 8a illustrates an encoding method according to an embodiment as a flowchart.

FIG. 7a illustrates an example of a quantization parameter evaluator 750, which may be a part of the transform unit 342, 442 or the quantizer 344, 444 or a separate element between the transform unit 342, 442 and the quantizer 344, 444. Furthermore, the quantization parameter evaluator 750 may be implemented for each encoder section 500, 502 of the encoder.

The quantization parameter evaluator 750 determines 902 a first quantization parameter Q1 for a first channel of the three (or more) color channels. The first channel is, for example, the luminance channel but can also be any of the two other color channels. In accordance with an embodiment, the first channel which quantization parameter is used as a reference in further determinations can be the luminance channel, or the channel with the highest spatial resolution among the channels. It can also be a virtual channel which quantization parameter is not used for any channels in the decoding process, but the first quantization parameter is determined solely as a reference for other quantization parameters.

In accordance with an embodiment, an intermediate quantization parameter for the first channel is calculated and this value is used as the first quantization parameter. Then the value of the intermediate quantization parameter is limited to be within a certain value range. If the value of the intermediate quantization parameter is outside the range, the value is clipped so that the value will be within the value range and that clipped value is then used as the quantization parameter for the first channel.

The first quantization parameter Q1 may be determined, for example, on the basis of residual values of the first channel and the value of the first quantization parameter Q1 may vary between different blocks.

The quantization parameter evaluator 750 also determines 904 a value for at least a first offset O1 defining a relationship between the first quantization parameter Q1 and a second quantization parameter for a block that contains residual samples from at least two channels. In accordance with an embodiment, the at least two channels are a first chrominance channel Cb and a second chrominance channel Cr.

A value of the first offset O1 may be a predetermined value or it may be common for multiple blocks or it may vary between different blocks. If the value of the first offset O1 is common for multiple blocks or is a fixed, predetermined value, the quantization parameter evaluator 750 does not need to determine the value of the first offset O1 for each such block separately.

The quantization parameter evaluator 750 further determines 906 the second quantization parameter Q2 for the block of residual samples or transform coefficients that contains the residual samples from the at least two channels. In accordance with an embodiment, the second quantization parameter Q2 is based on the first quantization parameter Q1 and the value of the first offset O1. For example, the first offset O1 is added to the first quantization parameter Q1, wherein the result of the summing operation is used as the value of the second parameter Q2. The determination of the second quantization parameter Q2 may be performed for each block or at least when the value of the first quantization parameter Q1 changes.

A residual coding mode selector 752 determines 908 which coding mode have been used for the block of residual samples or transform coefficients. If the residual coding mode selector 752 determines that coding of the block has been done across multiple color components or color channels of the video i.e. a cross-channel residual coding mode (a.k.a. a joint residual coding mode) has been used "Yes", the residual coding mode selector 752 provides 910 an indication, which indicates that joint residual coding of samples or transform coefficients from at least two channels shall be used for the block. In response to the selection of the joint residual coding mode, the second quantization parameter is selected 912 by the quantizer 344, 444 as the quantization parameter for the block of residual samples or transform coefficients. The quantizer 344, 444 performs a quantization operation 914 for the block of residual samples or transform coefficients using the second quantization parameter Q2. The quantized residual samples or transform coefficients can, for example, be inserted into a bitstream e.g. by the multiplexer 508.

If the residual coding mode selector 752 determines that coding of the block has not been done across multiple color components or color channels of the video i.e. the cross-channel residual coding mode has not been used "No", the residual coding mode selector 752 may provide an indication, which indicates that joint residual coding of samples or transform coefficients from at least two channels shall not be used for the block. Therefore, separate quantization parameters are provided for each channel and samples of each channel are quantized 916 using separate quantization parameters for each channel. It should be noted that it may not be necessary to indicate that the cross-channel residual coding mode has not been used wherein a lack of an indication of the cross-channel residual coding mode reveals that the cross-channel residual coding mode has not been used.

It should be noted here that the determination whether the cross-channel residual coding mode has been used or not may also be performed before obtaining the first offset O1 and estimating the value of the second quantization parameter Q2. Hence, if the determination of the coding mode reveals that the cross-channel residual coding mode has not been used, the quantization parameter evaluator 750 may not necessarily obtain the first offset O1 and/or estimate the value of the second quantization parameter Q2.

As was already mentioned above, the prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. Therefore, the dequantizer 346, 446 may be provided with information of the first quantization parameter and the second quantization parameter so that the dequantizer 346, 446 can use correct dequantization parameters when dequantizing the quantized coefficient values, e.g. DCT coefficients, to reconstruct the transform signal. The inverse transformation unit 348, 448 performs the inverse transformation to the reconstructed transform signal wherein the output of the inverse transformation unit 348, 448 contains reconstructed block(s).

In accordance with an embodiment, the first quantization parameter Q1 can also be calculated as an average or weighted average of two or more quantization parameters or intermediate values of such quantization parameters. In the case joint residual coding is applied for the first chrominance channel Cb and the second chrominance channel Cr, the first quantization parameter Q1 can be calculated, for example, as an average or a weighted average of the corresponding quantization parameters of the first chrominance channel Cb and the second chrominance channel Cr.

The parameter or parameters defining the relationship between the first quantization parameter Q1 and the second quantization parameter Q2 used for a residual block coded in cross-channel mode can be defined in different ways. For example, a second offset parameter O2, which may also be called as pps_cbcr_qp_offset, can be indicated in a picture parameter set defining an offset value between a first quantizer parameter Q1 and the second quantizer parameter Q2 for the block of cross-channel coded samples of transform coefficients. Alternatively, or in addition to, there may be other syntax elements defining other or alternative offsets to be added to the second quantization parameter Q2. For example, there can be a third offset parameter O3, which may also be called as tile_group_cbcr_qp_offset, in the tile group header. This third offset parameter O3 can define a further offset to be added to the second quantization parameter Q2. Alternatively, or in addition to, there may be other such indicators in different layers of the bitstream syntax.

In accordance with an embodiment, the quantization parameter evaluator 750 receives information whether the cross-channel residual coding mode has been selected for the block and only if the information indicates that the cross-channel residual coding mode has been selected, the quantization parameter evaluator 750 determines the second quantization parameter Q2 for the cross-channel coded block.

In accordance with an embodiment, the determination of the second quantization parameter Q2 for a cross-channel coded block, the quantization parameter evaluator 750 limits the value of the determined second quantization parameter Q2 according to a certain criteria. For example, if the determined value of the second quantization parameter Q2 would become smaller than a certain minimum value, the quantization parameter evaluator 750 sets the value of the second quantization parameter Q2 to the minimum value, or if the determined value of the second quantization parameter Q2 would become greater than a certain maximum value, the quantization parameter evaluator 750 sets the value of the second quantization parameter Q2 to the maximum value. In accordance with an embodiment, the quantization parameter evaluator 750 limits the value of the determined second quantization parameter Q2 within a certain value range. In other words, the value of the second quantization parameter Q2 will not be smaller than the minimum value and not greater than the maximum value. The minimum value, the maximum value and/or the range may be indicated to the quantization parameter evaluator 750 by some appropriate means or they may be fixed values or based on content of the video information, for example.

In accordance with an embodiment, a fourth offset O4 is defined. The value of the fourth offset O4 depends on the bit-depth of the video or image content. Hence, the value of the fourth offset O4 is added to the second quantization parameter Q2.

In accordance with an embodiment, the second quantization parameter Q2, which may also be expressed as QPcbcr, for a cross-channel coded block is calculated based on the average of a quantization parameter QPcb for the first chrominance channel Cb and a quantization parameter QPcr for the second chrominance channel Cr. For example as: QPcbcr=(QPcb+QPcr)/2.

In accordance with an embodiment, the second quantization parameter QPcbcr for a cross-channel coded block is calculated based on the average of the quantization parameter QPcb for the first chrominance channel Cb, the quantization parameter QPcr for the second chrominance channel Cr and at least one pre-defined or indicated fifth offset D. For example as: QPcbcr=(QPcb+QPcr)/2+D.

It should be noted here that although in the above disclosure a number of different offset parameters have been presented, i.e. the first to fifth offset parameter, it is not necessary to use all of these offset parameters but any subset or none of them may be used in the determination of the second quantization parameter Q2.

In the case a single offset or multiple offsets are indicated in the bitstream, the set of available offsets may be advantageously limited to include only negative integer values and the value zero. This kind of limitation may provide benefit in the case the average of the quantization parameter QPcb for the first chrominance channel Cb and the quantization parameter QPcr for the second chrominance channel Cr are used as a reference value for calculation for joint quantization parameter as the joint residual coding is affecting typically twice the number or residual samples and thus finer quantization with a smaller quantizer parameter may provide statistically better coding efficiency than using a higher quantizer.

Figure 7B:
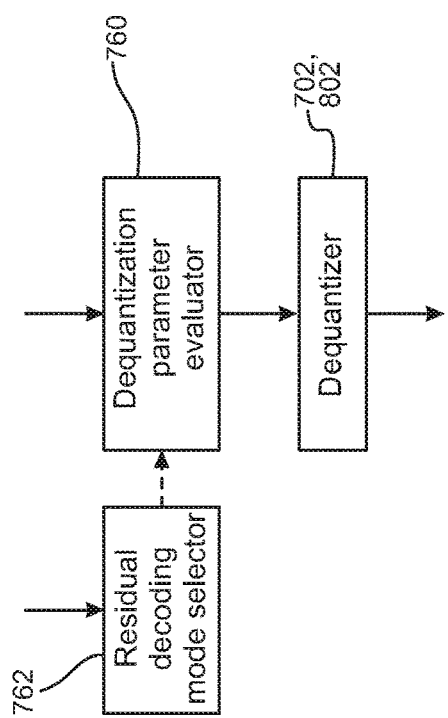
FIG. 7b illustrates an example of a quantization parameter evaluator of a decoder, in accordance with an embodiment.
Figure 8B:
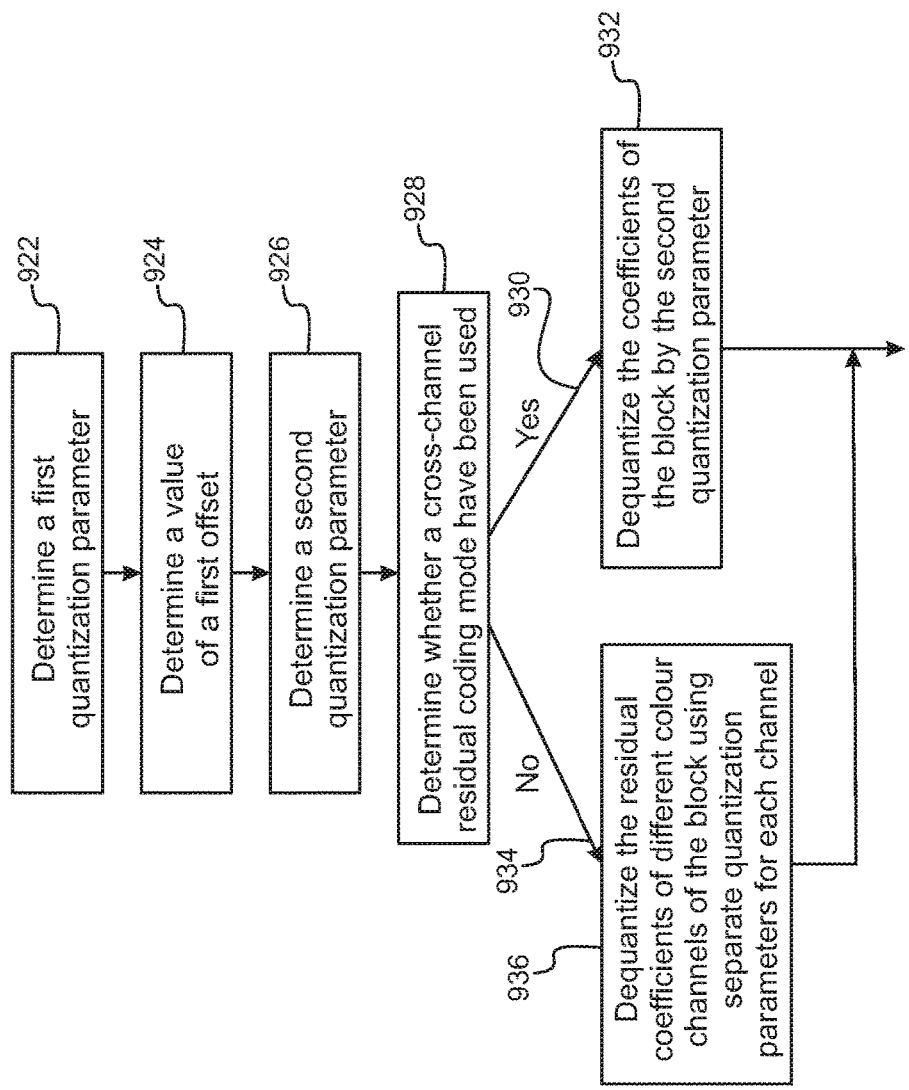
FIG. 8b illustrates a decoding method according to an embodiment as a flowchart.

In the following, an embodiment for decoding a picture by a video decoder will be described in more detail with reference to the block diagram of FIG. 7b and the flow diagram of FIG. 8b.

The dequantization parameter evaluator 760 determines 922 the first quantization parameter Q1 for the first channel of the three (or more) color channels. The first quantization parameter Q1 may have been signaled in a bitstream and received by the decoder so that the dequantization parameter evaluator 760 can determine the value of the first quantization parameter Q1 from the received information. Alternatively, the dequantization parameter evaluator 760 may determine the value of the first quantization parameter Q1 on the basis of received and reconstructed residual values of the first channel.

In accordance with an embodiment and similarly to the corresponding embodiment of the encoder, if the first quantization parameter Q1 is determined from received and reconstructed residual values of the first channel, an intermediate dequantization parameter for the first channel may be calculated and this value may then be used as the first quantization parameter. Then the value of the intermediate dequantization parameter is limited to be within a certain value range. If the value of the intermediate dequantization parameter is outside the range, the value is clipped so that the value will be within the value range and that clipped value is then used as the dequantization parameter for the first channel.

The dequantization parameter evaluator 760 also determines 924 the value for at least the first offset O1.

The value of the first offset O1 may be a predetermined value or it may be common for multiple blocks or it may vary between different blocks and may have been signaled in the bitstream. The signaling may be performed on a block-by-block basis, if the value may change between different blocks, wherein the dequantization parameter evaluator 760 determines the value of the first offset O1 for each block. On the other hand, if the value of the first offset O1 is common for multiple blocks or is fixed, signaling of the value may be performed at a higher signaling level, and the dequantization parameter evaluator 760 does not need to determine the value of the first offset O1 for each block separately.

The dequantization parameter evaluator 760 further determines 926 the second quantization parameter Q2 for the block of residual samples or transform coefficients that contains the residual samples from the at least two channels. In accordance with an embodiment, the second quantization parameter Q2 is based on the first quantization parameter Q1 and the value of the first offset O1. For example, the first offset O1 is added to the first quantization parameter Q1, wherein the result of the summing operation is used as the value of the second parameter Q2. The determination of the second quantization parameter Q2 may be performed for each block or at least when the value of the first quantization parameter Q1 changes.

A residual decoding mode selector 762 determines 928 which coding mode have been used for the block of residual samples or transform coefficients. If the residual decoding mode selector 762 determines that coding of the block has been the cross-channel residual coding mode "Yes", the residual decoding mode selector 762 instructs 930 the dequantizer 702, 802 to use the second quantization parameter as the quantization parameter for the block of residual samples or transform coefficients. The dequantizer 702, 802 performs 932 an inverse quantization operation 934 for the block of residual samples or transform coefficients using the second quantization parameter Q2. The quantized residual samples or transform coefficients can, for example, be reconstructed from a bitstream.

If the residual decoding mode selector 762 determines that the cross-channel residual coding mode has not been used "No", the residual decoding mode selector 762 instructs 934 the dequantizer 702, 802 to use 936 separate quantization parameters provided for each channel and use them in the dequantization process of residuals of each channel.

It should be noted here that the determination whether the cross-channel residual coding mode has been used or not may also be performed before obtaining the first offset O1 and estimating the value of the second quantization parameter Q2. Hence, if the determination of the coding mode reveals that the cross-channel residual coding mode has not been used, the dequantization parameter evaluator 760 may not necessarily obtain the first offset O1 and/or estimate the value of the second quantization parameter Q2.

In accordance with an embodiment, the first quantization parameter Q1 can also be calculated as an average or weighted average of two or more quantization parameters or intermediate values of such quantization parameters. In the case joint residual coding is applied for the first chrominance channel Cb and the second chrominance channel Cr, the first quantization parameter Q1 can be calculated, for example, as an average or a weighted average of the corresponding quantization parameters of the first chrominance channel Cb and the second chrominance channel Cr.

In accordance with an embodiment, the dequantization parameter evaluator 760 receives information whether the cross-channel residual coding mode has been selected for the block and only if the information indicates that the cross-channel residual coding mode has been selected, the dequantization parameter evaluator 760 determines the second quantization parameter Q2 for the cross-channel coded block.

If the quantization parameters Q1, Q2 are not received in the bitstream, the decoder may reconstruct them utilizing similar principles than presented above in connection with the encoding. In other words, a value of the second quantization parameter Q2 may be limited within a certain value range, or a minimum and/or a maximum value may have been defined for the second quantization parameter Q2. Hence, the dequantization parameter evaluator 760 limits the value of the determined second quantization parameter Q2 so that the final value of the second quantization parameter Q2 does not exceed the limit(s). The minimum value, the maximum value and/or the range may be indicated to the dequantization parameter evaluator 760 by some appropriate means or they may be fixed values or based on content of the video information, for example.

Figure 9:
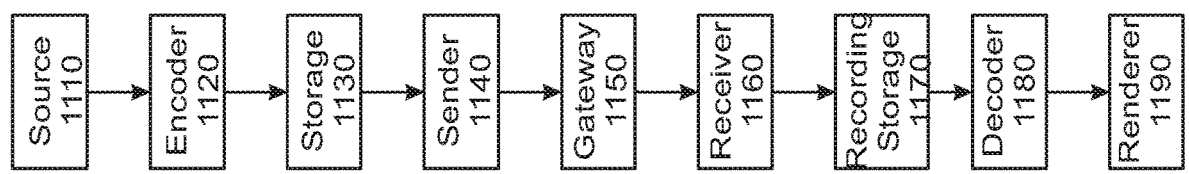
FIG. 9 shows a schematic diagram of an example multimedia communication system within which various embodiments may be implemented.

FIG. 9 is a graphical representation of an example multimedia communication system within which various embodiments may be implemented. A data source 1110 provides a source signal in an analog, uncompressed digital, or compressed digital format, or any combination of these formats. An encoder 1120 may include or be connected with a pre-processing, such as data format conversion and/or filtering of the source signal. The encoder 1120 encodes the source signal into a coded media bitstream. It should be noted that a bitstream to be decoded may be received directly or indirectly from a remote device located within virtually any type of network. Additionally, the bitstream may be received from local hardware or software. The encoder 1120 may be capable of encoding more than one media type, such as audio and video, or more than one encoder 1120 may be required to code different media types of the source signal. The encoder 1120 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-tiding stream). It should also be noted that the system may include many encoders, but in the figure only one encoder 1120 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1130. The storage 1130 may comprise any type of mass memory to store the coded media bitstream. The format of the coded media bitstream in the storage 1130 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1120 or the storage 1130 may comprise the file generator, or the file generator is operationally attached to either the encoder 1120 or the storage 1130. Some systems operate "live", i.e. omit storage and transfer coded media bitstream from the encoder 1120 directly to the sender 1140. The coded media bitstream may then be transferred to the sender 1140, also referred to as the server, on a need basis. The format used in the transmission may be an elementary self-contained bitstream format, a packet stream format, or one or more coded media bitstreams may be encapsulated into a container file. The encoder 1120, the storage 1130, and the server 1140 may reside in the same physical device or they may be included in separate devices. The encoder 1120 and server 1140 may operate with live real-time content, in which case the coded media bitstream is typically not stored permanently, but rather buffered for small periods of time in the content encoder 1120 and/or in the server 1140 to smooth out variations in processing delay, transfer delay, and coded media bitrate.

The server 1140 may send the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1140 encapsulates the coded media bitstream into packets. For example, when RTP is used, the server 1140 encapsulates the coded media bitstream into RTP packets according to an RTP payload format. Typically, each media type has a dedicated RTP payload format. It should be again noted that a system may contain more than one server 1140, but for the sake of simplicity, the following description only considers one server 1140.

If the media content is encapsulated in a container file for the storage 1130 or for inputting the data to the sender 1140, the sender 1140 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 1140 may or may not be connected to a gateway 1150 through a communication network. The gateway may also or alternatively be referred to as a middle-box. It is noted that the system may generally comprise any number gateways or alike, but for the sake of simplicity, the following description only considers one gateway 1150. The gateway 1150 may perform different types of functions, such as caching packets, streams or resources, pre-fetching media data pro-actively, translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1150 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1150 may be called an RTP mixer or an RTP translator and may act as an endpoint of an RTP connection. Instead of or in addition to the gateway 1150, the system may include a splicer which concatenates video sequence or bitstreams.

The system includes one or more receivers 1160, typically capable of receiving, de-modulating, and de-capsulating the transmitted signal into a coded media bitstream. The coded media bitstream may be transferred to a recording storage 1170. The recording storage 1170 may comprise any type of mass memory to store the coded media bitstream. The recording storage 1170 may alternatively or additively comprise computation memory, such as random access memory. The format of the coded media bitstream in the recording storage 1170 may be an elementary self-contained bitstream format, or one or more coded media bitstreams may be encapsulated into a container file. If there are multiple coded media bitstreams, such as an audio stream and a video stream, associated with each other, a container file is typically used and the receiver 1160 comprises or is attached to a container file generator producing a container file from input streams. Some systems operate "live," i.e. omit the recording storage 1170 and transfer coded media bitstream from the receiver 1160 directly to the decoder 1180. In some systems, only the most recent part of the recorded stream, e.g., the most recent 10-minute excerption of the recorded stream, is maintained in the recording storage 1170, while any earlier recorded data is discarded from the recording storage 1170.

The coded media bitstream may be transferred from the recording storage 1170 to the decoder 1180. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1170 or a decoder 1180 may comprise the file parser, or the file parser is attached to either recording storage 1170 or the decoder 1180. It should also be noted that the system may include many decoders, but here only one decoder 1170 is discussed to simplify the description without a lack of generality The coded media bitstream may be processed further by a decoder 1170, whose output is one or more uncompressed media streams. Finally, a renderer 1190 may reproduce the uncompressed media streams with a loudspeaker or a display, for example. The receiver 1160, recording storage 1170, decoder 1170, and renderer 1190 may reside in the same physical device or they may be included in separate devices.

In the above, some embodiments have been described in relation to terms representation and/or bitstream. It needs to be understood that embodiments may be similarly be described in relation to similar terms, e.g. a representation instead of a bitstream, a bitstream instead of a representation, or an elementary stream instead of a bitstream or a representation.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. The computer software may cause the relevant apparatuses, such as encoder or decoder, to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments can be implemented with the help of a non-transitory computer-readable medium encoded with instructions that, when executed by a computer, perform the various embodiments.

If desired, the different functions discussed herein may be performed in a different order and/or concurrently with each other. Furthermore, if desired, one or more of the above-described functions may be optional or may be combined. Furthermore, the present embodiments are disclosed in relation to a method for decoding and to a decoder. However, the teachings of the present disclosure can be applied in an encoder configured to perform encoding of coding units and coding the indication the presence of escape coding within the coding unit.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The embodiments may provide some advantages. For example, accuracy of the motion compensated prediction may be improved by providing a bitrate efficient way of signaling additional information required to model higher order motion vector fields.

The invention claimed is:

1. A method comprising:
obtaining a first quantization parameter derived for a luminance channel of a video presentation or an image, the first quantization parameter configured to be used as a reference to determine a value of a second quantization parameter;
receiving a block that contains quantized residual coefficients of a first chrominance channel and a second chrominance channel of the video presentation or the image;
obtaining an offset;
determining whether the block has been encoded using a cross-channel residual coding mode;
determining the value of the second quantization parameter using the first quantization parameter derived for the luminance channel and the offset, when the block has been encoded using the cross-channel residual coding mode, the second quantization parameter configured to be used to jointly dequantize the residual coefficients of the first chrominance channel and the second chrominance channel; and
reconstructing residual samples for the first chrominance channel and the second chrominance channel with dequantizing the quantized residual coefficients of the first chrominance channel and the second chrominance channel jointly using the value of the second quantization parameter determined using the first quantization parameter derived for the luminance channel and the offset, when the block has been encoded using a cross-channel residual coding mode.

2. The method according to claim 1 further comprising:
determining whether a value of the first quantization parameter is within a range;
adjusting the value of the first quantization parameter when the value of the first quantization parameter is not within the range; and
determining the value of the second quantization parameter using the value of the first quantization parameter.

3. The method according to claim 1 further comprising:
obtaining one or more limiting criteria, wherein the one or more limiting criteria comprises at least one of: the second quantization parameter not being smaller than a minimum value, the second quantization parameter not being greater than a maximum value, or the second quantization parameter not being outside a value range; and
limiting the value of the second quantization parameter to fulfil the one or more limiting criteria.

4. The method according to claim 1 further comprising:
determining another offset based on a bit-depth of the video presentation or the image; and
determining the value of the second quantization parameter using the another offset.

5. The method of claim 1, further comprising:
providing an indication that the block is to be encoded using the cross-channel residual coding mode.

6. The method of claim 1, further comprising:
determining that the block is to be encoded using a cross-channel residual coding mode when there is a lack of an indication that the block is to be encoded using the cross-channel residual coding mode.

7. The method of claim 1, wherein:
the offset is indicated in a picture parameter set; and
a second offset within a tile group header is used to determine the value of the second quantization parameter.

8. The method of claim 1, wherein a value of the offset is a negative integer or zero.

9. The method of claim 1, further comprising:
determining whether the offset is common for multiple blocks or comprises a predetermined value;
wherein the offset is not determined for blocks separately, when the offset is common for multiple blocks or comprises a predetermined value.

10. The method of claim 1, further comprising:
determining the value of the second quantization parameter when the value of the first quantization parameter changes.

11. An apparatus comprising:
at least one processor; and
at least one non-transitory memory including computer program code;
the at least one non-transitory memory and the computer program code configured to, with the at least one processor, cause the apparatus at least to perform:
obtain a first quantization parameter derived for a luminance channel of a video presentation or an image, the first quantization parameter configured to be used as a reference to determine a value of a second quantization parameter;
receive a block that contains quantized residual coefficients of a first chrominance channel and a second chrominance channel of the video presentation or the image;
obtain an offset;
determine whether the block has been encoded using a cross-channel residual coding mode;
determine the value of the second quantization parameter using the first quantization parameter derived for the luminance channel and the offset, when the block has been encoded using the cross-channel residual coding mode, the second quantization parameter configured to be used to jointly dequantize the residual coefficients of the first chrominance channel and the second chrominance channel; and
reconstruct residual samples for the first chrominance channel and the second chrominance channel with dequantizing the quantized residual coefficients of the first chrominance channel and the second chrominance channel jointly using the value of the second quantization parameter determined using the first quantization parameter derived for the luminance channel and the offset, when the block has been encoded using a cross-channel residual coding mode.

12. The apparatus according to claim 11, wherein the apparatus is further caused to:
determine whether a value of the first quantization parameter is within a range;
adjust the value of the first quantization parameter when the value of the first quantization parameter is not within the range; and
determine the value of the second quantization parameter using the value of the first quantization parameter.

13. The apparatus according to claim 11, wherein the apparatus is further caused to:
obtain one or more limiting criteria, wherein the one or more limiting criteria comprises at least one of: the second quantization parameter not being smaller than a minimum value, the second quantization parameter not being greater than a maximum value, or the second quantization parameter not being outside a value range; and
limit the value of the second quantization parameter to fulfil the one or more limiting criteria.

14. The apparatus according to claim 11, wherein the apparatus is further caused to:
determine another offset based on a bit-depth of the video presentation or the image; and
determine the value of the second quantization parameter using the another offset.

15. The apparatus according to claim 11, wherein the apparatus is further caused to:
use information of the luminance channel; and
use information of the channel which has a highest spatial resolution.

16. A method comprising:
determining a first quantization parameter derived for a luminance channel of a video presentation or an image, the first quantization parameter configured to be used as a reference to determine a value of a second quantization parameter,
determining an offset;
determining whether a block of residual samples for a first chrominance channel and a second chrominance channel of the video presentation or the image has been encoded using a cross-channel residual coding mode;
determining the value of the second quantization parameter using the first quantization parameter derived for the luminance channel and the offset, when the block has been encoded using the cross-channel residual coding mode, the second quantization parameter configured to be used to jointly quantize the residual coefficients of the first chrominance channel and the second chrominance channel; and
quantizing the residual samples jointly for the first chrominance channel and the second chrominance channel of the video presentation or the image to obtain jointly quantized residual coefficients of the first chrominance channel and the second chrominance channel using the value of the second quantization parameter determined using the first quantization parameter derived for the luminance channel and the offset, when the block has been encoded using the cross-channel residual coding mode.

17. An apparatus comprising
at least one processor; and
at least one non-transitory memory including computer program code;
the at least one non-transitory memory and the computer program code configured to, with the at least one processor, cause the apparatus at least to perform:
determine a first quantization parameter derived for a luminance channel of a video presentation or an image, the first quantization parameter configured to be used as a reference to determine a value of a second quantization parameter,
determine an offset;
determine whether a block of residual samples for a first chrominance channel and a second chrominance channel of the video presentation or the image has been encoded using a cross-channel residual coding mode;

determine the value of the second quantization parameter using the first quantization parameter derived for the luminance channel and the offset, when the block has been encoded using the cross-channel residual coding mode, the second quantization parameter configured to be used to jointly quantize the residual coefficients of the first chrominance channel and the second chrominance channel; and quantize the residual samples jointly for the first chrominance channel and the second chrominance channel of the video presentation or the image to obtain jointly quantized residual coefficients of the first chrominance channel and the second chrominance channel using the value of the second quantization parameter determined using the first quantization parameter derived for the luminance channel and the offset, when the block has been encoded using the cross-channel residual coding mode.

18. The apparatus according to claim 17, wherein the apparatus is further caused to:

determine whether a value of the first quantization parameter is within a range;

adjust the value of the first quantization parameter when the value of the first quantization parameter is not within the range; and determine the value of the second quantization parameter using the value of the first quantization parameter.

19. The apparatus according to claim 17, wherein the apparatus is further caused to:

obtain one or more limiting criteria, wherein the one or more limiting criteria comprises at least one of: the second quantization parameter not being smaller than a minimum value, the second quantization parameter not being greater than a maximum value, or the second quantization parameter not being outside a value range; and limit the value of the second quantization parameter to fulfil the one or more limiting criteria.

20. The apparatus according to claim 17, wherein the apparatus is further configured to:

use information of the luminance channel; and use information of a channel which has a highest spatial resolution.

* * * * *